United States Patent
Ruhlander et al.

(10) Patent No.: US 8,490,512 B2
(45) Date of Patent: Jul. 23, 2013

(54) CONTROL CABLE ASSEMBLY WITH DAMPENING

(75) Inventors: Gregory P. Ruhlander, Hannibal, MO (US); Donald G. Gordy, Moberly, MO (US)

(73) Assignee: Dura Operating, LLC, Auburn Hills, MI (US)

( * ) Notice: Subject to any disclaimer, the term of this patent is extended or adjusted under 35 U.S.C. 154(b) by 800 days.

(21) Appl. No.: 12/257,028

(22) Filed: Oct. 23, 2008

(65) Prior Publication Data

US 2010/0101362 A1   Apr. 29, 2010

(51) Int. Cl.
*G05G 7/10* (2006.01)

(52) U.S. Cl.
USPC .......................................... 74/502.4; 74/502.6

(58) Field of Classification Search
USPC ............. 74/500.5, 502.4–502.6, 531; 248/61, 248/564, 566; 174/41, 42; 285/406, 408; 188/196 P, 196 M, 378, 379; 439/445, 447
See application file for complete search history.

(56) References Cited

U.S. PATENT DOCUMENTS

| | | | | |
|---|---|---|---|---|
| 430,690 | A | * | 6/1890 | Robinson ........................ 191/40 |
| 1,872,605 | A | * | 8/1932 | Pohlhausen ..................... 248/63 |
| 2,172,810 | A | * | 9/1939 | Sherman ......................... 248/65 |
| 2,399,133 | A | | 4/1946 | Midling |
| 3,223,201 | A | * | 12/1965 | Waner ............................. 188/67 |
| 3,463,870 | A | * | 8/1969 | Eucker ............................ 174/42 |
| 3,846,033 | A | | 11/1974 | Smollinger |
| 4,072,213 | A | | 2/1978 | Salmon |
| 4,339,213 | A | | 7/1982 | Gilmore |
| 4,348,348 | A | | 9/1982 | Bennett et al. |
| 4,378,712 | A | | 4/1983 | Yoshifuji |
| 4,620,059 | A | | 10/1986 | Sherman |
| 4,716,001 | A | | 12/1987 | Kottke |
| 4,762,017 | A | | 8/1988 | Jaksic |
| 4,998,446 | A | | 3/1991 | Towne et al. |
| 5,207,116 | A | | 5/1993 | Sultze |
| 5,842,552 | A | | 12/1998 | Colber et al. |
| 5,884,531 | A | | 3/1999 | Koenig |
| 6,148,689 | A | | 11/2000 | Uneme |
| 6,510,759 | B2 | | 1/2003 | Johnson |
| 6,520,043 | B1 | | 2/2003 | Wang |
| 6,748,820 | B2 | | 6/2004 | Ruhlander |
| 6,857,626 | B2 | | 2/2005 | Burlage et al. |
| 6,898,996 | B2 | | 5/2005 | Freund et al. |
| 2003/0089189 | A1 | * | 5/2003 | Tchoi ........................ 74/502.4 |

* cited by examiner

FOREIGN PATENT DOCUMENTS

| | | | |
|---|---|---|---|
| JP | 08249079 A | * | 9/1996 |
| KR | 2005-0046128 | | 5/2005 |
| WO | WO2006105573 A1 | | 10/2006 |

OTHER PUBLICATIONS

Written Opinion & International Search Report for PCT/US09/61806, mailed May 25, 2010, 7 pages.

*Primary Examiner* — Marcus Charles
*Assistant Examiner* — Thomas Diaz
(74) *Attorney, Agent, or Firm* — Reising Ethington; Matthew J. Schmidt; Dean B. Watson

(57) ABSTRACT

In one implementation, a shifter assembly for a vehicle transmission, may include a shifter adapted to move between at least two positions corresponding to different modes of operation of the transmission, a cable connection feature associated with the shifter, and a cable connected to the cable connection feature and adapted to be connected to the transmission such that movement of the shifter is transmitted to the transmission by the cable. The cable may include a conduit, a core received within the conduit, and a dampener connected to the conduit. The dampener in the preferred embodiment bends the conduit and engages the core with the conduit.

16 Claims, 3 Drawing Sheets

CONTROL CABLE ASSEMBLY WITH DAMPENING

FIELD OF THE INVENTION

The present invention relates generally to a cable assembly and more particularly to a cable assembly with a dampener that may dampen vibrations in the cable assembly.

BACKGROUND OF THE INVENTION

Motion transmitting cable assemblies or control cables include push-pull cables and rotating cables. Such cables may include a flexible core element slidably disposed within an outer sheath or conduit. The ends of the cables are connected between a drive member and a driven member such that movement of the drive member is transmitted to and causes a corresponding movement of the driven member. Typical applications of control cables in vehicles include, but are not limited to, parking brakes, throttle control, hood releases, gas tank door cables, brake releases, trunk releases, seat controls, powered actuators and transmission shifter cables.

Vibrations can be transmitted between the drive and driven members along the core element and/or the conduit. In the example of an automotive transmission shift lever assembly, vibrations can be transmitted along the shifter cable from the transmission to the shifter assembly in the automobile cockpit and undesirably may be noticeable to occupants of the automobile. In other applications it may be desirable to adjust the actuation force needed to move the core element relative to the conduit to, for example, improve shift feel.

SUMMARY OF THE INVENTION

Disclosed herein is a control cable assembly with dampening. In one implementation, a shifter assembly for a vehicle transmission, may include a shifter adapted to move between at least two positions corresponding to different modes of operation of the transmission, a cable connection feature associated with the shifter, and a cable connected to the cable connection feature and adapted to be connected to the transmission such that movement of the shifter is transmitted to the transmission by the cable. The cable may include a conduit, a core received within the conduit, and a dampener connected to the conduit. The dampener in the preferred embodiment bends the conduit and engages the core with the conduit.

In another implementation, a cable assembly may include a conduit including a passage, a core received within the passage, and a dampener connected to the conduit to bend the conduit and engage the core with the conduit. The dampener may include a body adapted to engage the cable, and at least one connection feature carried by the body and adapted to connect the dampener to the cable. At least a portion of the body that is adapted to engage the cable may be laterally offset from at least one connection feature such that the cable may be bent in the area of or between the connection feature and the portion of the body that engages the cable.

In another implementation there is disclosed a dampener for a shift cable or other cable assembly. The dampener may include a body adapted to engage the cable and at least one connection feature carried by the body and adapted to connect the body to the cable. At least a portion of the body that is adapted to engage the cable may be laterally offset from the connection feature such that the cable may be bent in the area of the connection feature and the portion of the body that engages the cable. In one form, the dampener includes a wire form shaped to engage and bend a cable to reduce the transmission of noise and/or vibration in an amount more than without the wire form engaged with the cable.

BRIEF DESCRIPTION OF THE DRAWINGS

The following detailed description of preferred implementations and best mode will be set forth with regard to the accompanying drawings, in which.

DETAILED DESCRIPTION OF PREFERRED EMBODIMENTS

Figure 1:
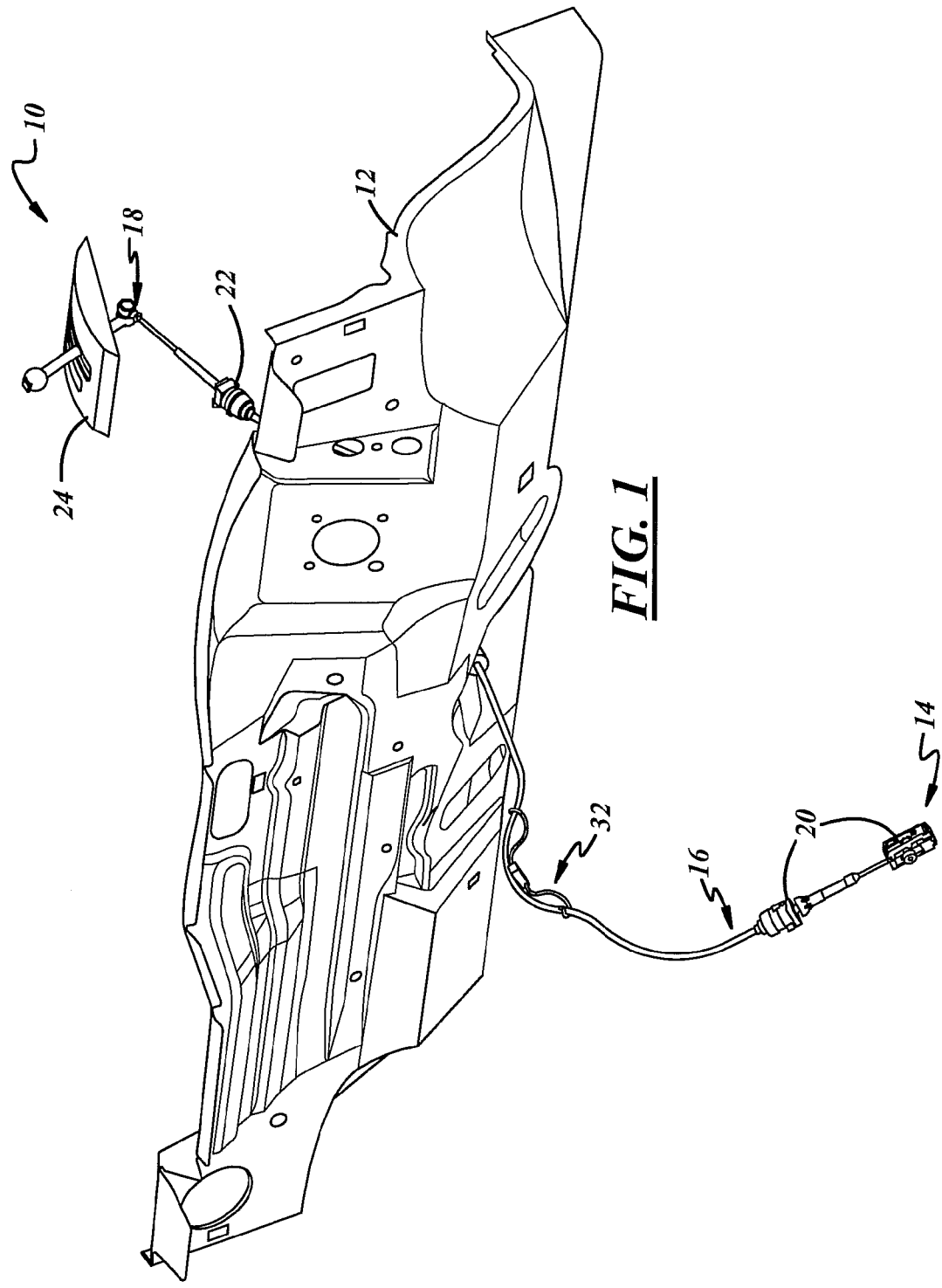
FIG. 1 is a perspective view of a transmission shifter assembly for a vehicle transmission shown extending from an engine compartment into the passenger compartment of a vehicle.
Figure 2:
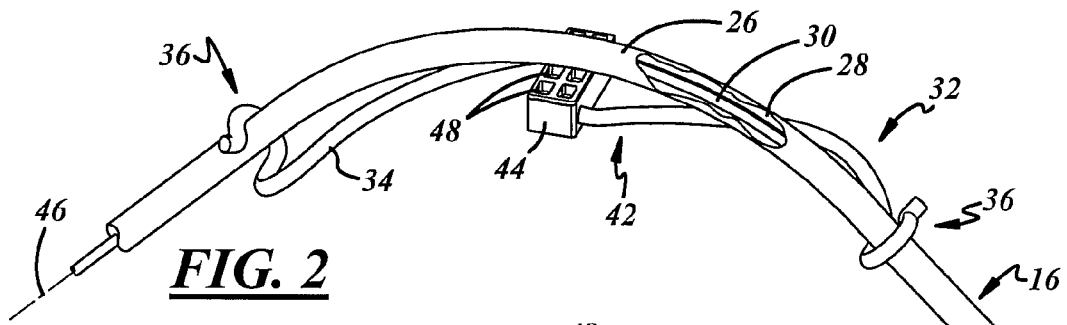
FIG. 2 is a fragmentary perspective view of a dampener attached to a cable.
Figure 3:
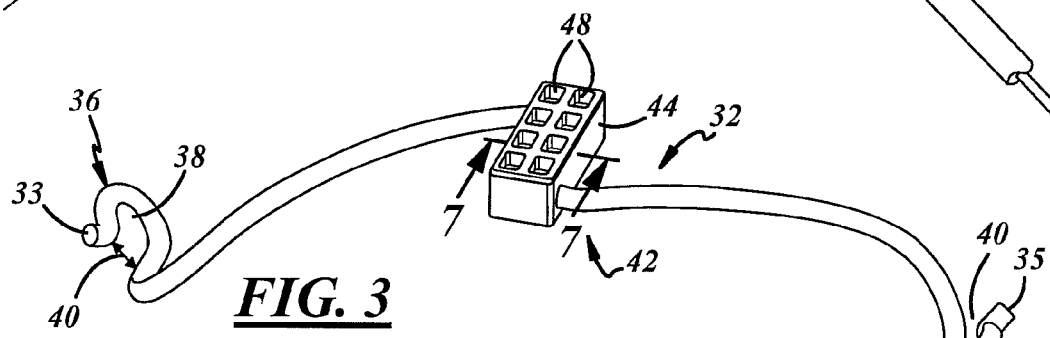
FIG. 3 is a perspective view of the dampener of FIG. 2.
Figure 4:
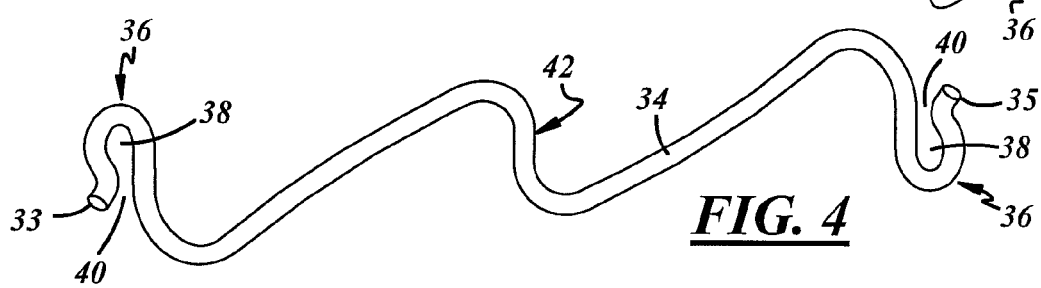
FIG. 4 is a perspective view of a body portion of the dampener.

Referring in more detail to the drawings, FIG. 1 illustrates a transmission shifter control cable assembly 10 extending through a vehicle panel 12 or fire wall such that one end 14 of a cable 16 is received within an engine compartment of the vehicle and the other end 18 is received within the passenger compartment of the vehicle. Appropriate connectors 20, 22 may be provided at each end of the cable 16 to facilitate connecting one end to the vehicle transmission and the other end to a shift lever 24 or other device that may be, for example, manually operated by a driver of the vehicle. As shown in FIG. 2, the cable 16 may be of generally known construction including a tubular outer sheath or conduit 26 having a central passage 28 in which an inner core element 30 is received for movement relative to the conduit 26. The core element 30 may be formed from wire strand or may be solid, as is known in the art. The conduit 26 may be of any suitable construction including a polymeric material which may include wire reinforcement. So constructed and arranged, the cable 16 is relatively flexible and adapted to transmit movement of the shift lever 24 to the transmission to effect a change in the transmission through movement of the core element 30.

As shown in FIGS. 1 and 2, a control device or dampener 32 is connected to and may engage the cable 16 at two or more points or locations along the cable and provides a force acting on the cable 16 which tends to bend or otherwise alter the shape of the cable generally in accordance with the shape of the dampener 32 or in another manner as directed by the dampener. The dampener 32 may be independent of any other structure, or may if desired be carried by, connected to or otherwise associated with another structure in the vehicle.

In one implementation, the dampener 32 includes a wire form body 34 bent into a desired configuration. The body 34 preferably is rigid enough to maintain the bend in the cable during movement of the core within the conduit, such as during operation of the shift lever 24 and cable assembly 10.

In one implementation, the wire form is formed of ASTM A228 music wire and has a diameter of 4 mm, although other materials and sizes of material may be used.

In the implementation shown, a pair of connection features 36 are provided with a separate one generally adjacent each end 33, 35 of the body 34. The connection features 36 may be formed by bends of the body 34 which may form open loops, hooks or the like at each end. Stated differently, the body and connection features of the dampener 32 may both be provided in a wire form shaped to engage and bend the cable. Each hook may have an opening 38 sized to accommodate the cable 16 therein and an entry portion 40 leading to the opening 38 that is smaller than the outer diameter of the conduit 26 such that the cable can be snap-fit into the opening 38 through the entry portion 40, or the dampener may be clipped onto the cable. The conduit 26, the hooks, or both, may flex or give to permit the snap-fit receipt of the cable 16 into the connection features 36. Of course, the openings 38 and entry portions 40 thereof may be larger than the cable 16 so that the cable is slidably received and not snap-fit into the openings 38 which may facilitate assembly, and/or other connection features can be provided and the connection features may be formed separately from and carried by or otherwise associated with the body. To inhibit unintended removal of the dampener 32 from the cable 16, the entry portions 40 of the openings 38 may be circumferentially offset relative to one another such that the cable 16 is inserted into one connection feature 36 in a different direction than it is inserted in the other connection feature 36. In the implementation shown, the entry portions 40 of the openings 38 are generally opposite, or 180 degrees offset, such that the cable 16 is first snapped into one opening 38 through its entry portion 40 and then is snapped into the opening 38 of the other connection feature 36 in the opposite direction. Accordingly, a force tending to remove one connection feature 36 from the cable 16 acts in a direction that forces the other connection feature 36 more securely onto the cable 16 to resist complete removal of the dampener 32.

Figure 5:
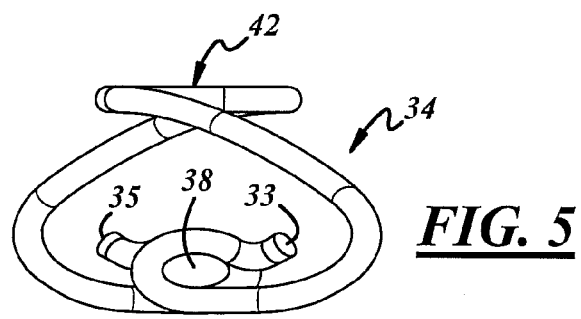
FIG. 5 is an end view of the body of the dampener.
Figure 6:
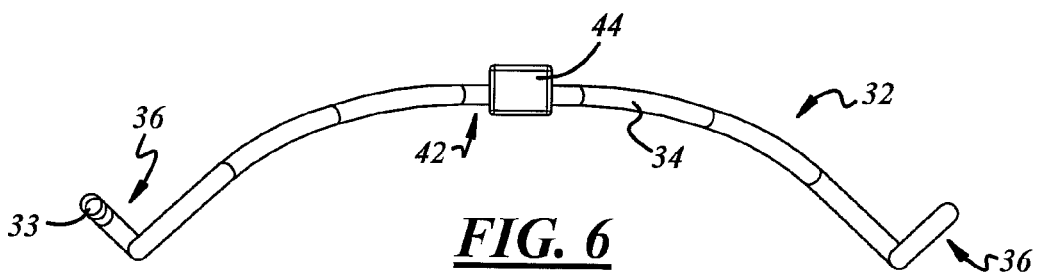
FIG. 6 is a front view of the dampener.
Figure 7:
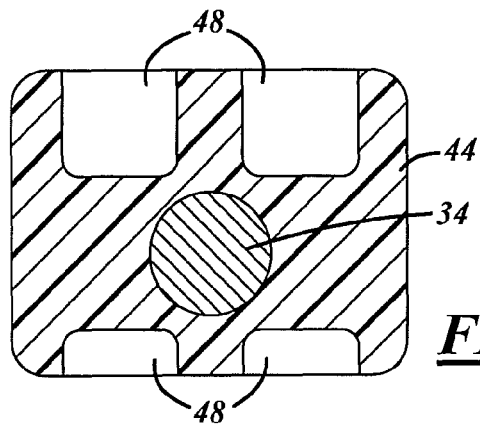
FIG. 7 is a cross sectional view taken generally along line 7-7 in FIG. 3.

In one preferred implementation, as best shown in FIGS. 5 and 6, at least one of the connection features 36 is not aligned with or is laterally offset from a portion of the body 34 that is adapted to be disposed adjacent to the cable. In this manner, the dampener 32 is not linear between all points of contact with the cable and the dampener 32 bends or otherwise imparts a non-linear shape to the cable when it is attached to the cable. In the implementation shown, each end 33, 35 of the body 34 is not aligned with or is laterally offset from a mid portion 42 of the body 34 which is adapted to be disposed adjacent to the cable 16, as best shown in FIG. 2.

The mid portion 42 of the cable 16 may include or carry a pad 44 that is adapted to directly engage the conduit 26 of the cable 16, as best shown in FIG. 2. The pad 44 may be disposed on a transition portion of the body 34 and may be overmolded thereto such that the pad 44 extends generally transversely to a longitudinal axis 46 of the cable 16 and has a length sufficient to prevent the cable 16 from slipping or sliding off the pad 44. This, and alignment of the openings 38 with the pad 44, ensures that the pad 44 remains in contact with the cable 16 and the cable 16 is properly routed along the dampener 32. The pad 44 may be formed from a polymeric material, such as an elastomer, to damp vibrations in the cable 16, especially the conduit 26 with which it is engaged. The pad 44 may have a plurality of cavities or pockets 48 formed therein to reduce material, improve vibration damping or for any other reason. In the implementation shown, the pad 44 is provided in a discreet area of the body 34 and the dampener 32 contacts the cable 16 only at the connection features 36 and at the pad 44. Of course, other implementations can be utilized, with or without any pad(s) 44, to provide two or more spaced apart points of contact with the cable 16 to bend the cable 16 as desired. Or, for example, the body 34 may substantially continuously contact the cable 16 along a substantial portion or all of the length of the body, or along spaced apart segments of desired length along the body. In such an arrangement, the body could be formed from, coated or otherwise provided with a material to enhance vibration dampening of the cable.

Figure 8:
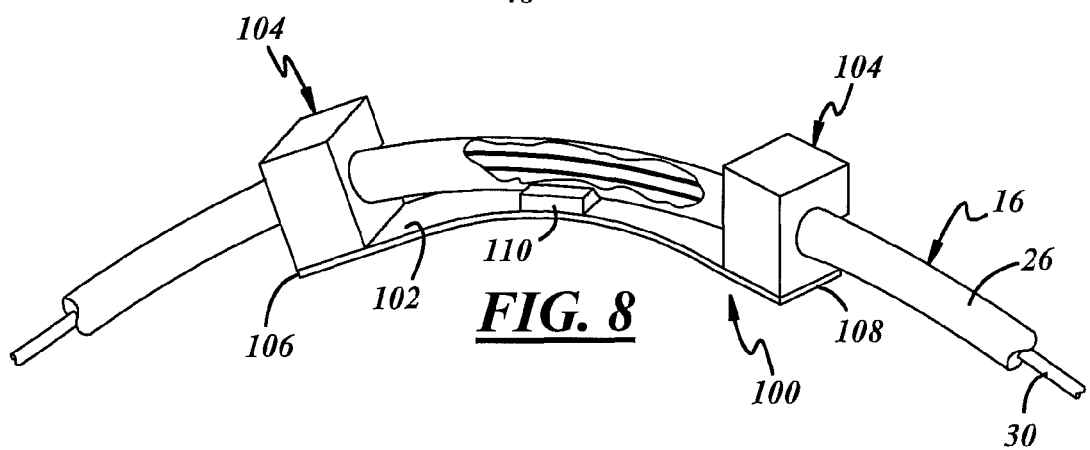
FIG. 8 is a perspective view of an alternate cable control assembly shown attached to a cable.
Figure 9:
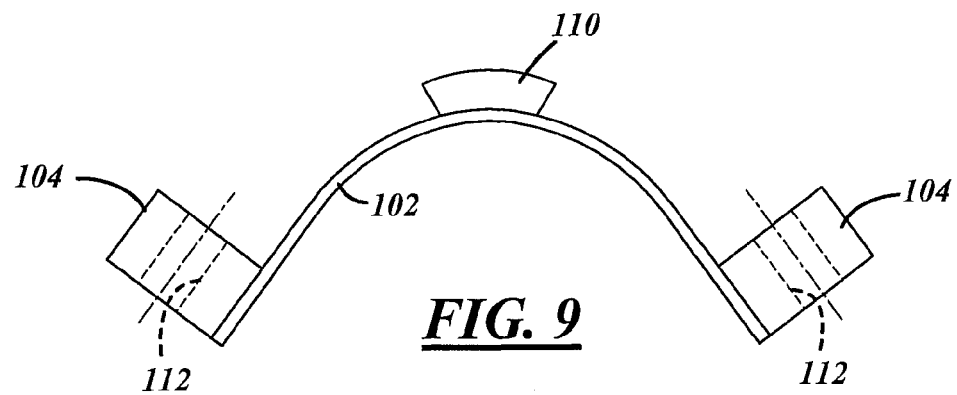
FIG. 9 is an end view of the dampener of FIG. 8 with the cable removed.
Figure 10:
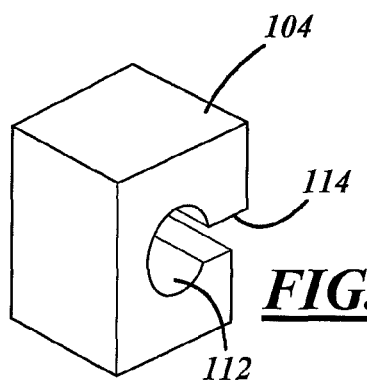
FIG. 10 is a perspective view of an end connector of the dampener of FIGS. 8 and 9.

Another implementation of a dampener 100 is shown in FIGS. 8-10. This dampener 100 includes a body 102 formed of a flat strip of material, which may be metal, such as spring steel. The body 102 may be bent into a generally smoothly curved U-shape, or otherwise as desired. Connection features 104 may be provided adjacent each end 106, 108 of the body 102, or elsewhere along the body as desired. A pad 110 may be carried by or otherwise associated with the body 102 to engage the conduit 26 of the cable 16, in the same general manner as the pad 44 of the dampener 32. In the implementation shown, the pad 110 is disposed in the area of the apex of the curve in the body 102. The dampener 100 engages the conduit 26 at three spaced apart locations including the pad 110, and each connection feature 104. At least two points of contact are laterally offset or not aligned with each other such that the dampener 100 imparts a desired shape or bend to the cable 16.

The connection features 104 may be formed in one-piece with, adhered or bonded to, molded on, crimped, roll-formed, threaded, fastened, welded, or otherwise carried by or associated with the body 102 to retain the cable 16 adjacent to the body 102. In one implementation, the connection features 104 are formed from a polymeric material having suitable strength and rigidity to retain the cable 16 when the cable is bent, and suitable vibration damping characteristics. Each connection feature 104 has an opening 112 sized to receive the conduit 26 therein and an entry portion 114 leading to the opening 112 that is smaller than the outer diameter of the conduit 26 so that the conduit is snap-fit or otherwise force fit through the entry portion 114 and into the opening 112. Of course, other connection features 104 may be used including, by way of examples without limitation, ties, bands, hooks, clips, slots or openings through which the cable is routed, and a snap-fit receipt of the cable may not be needed to retrain the dampener adjacent to the cable. The dampener 100 may function and be sized like the dampener 32, if desired.

Figure 11:
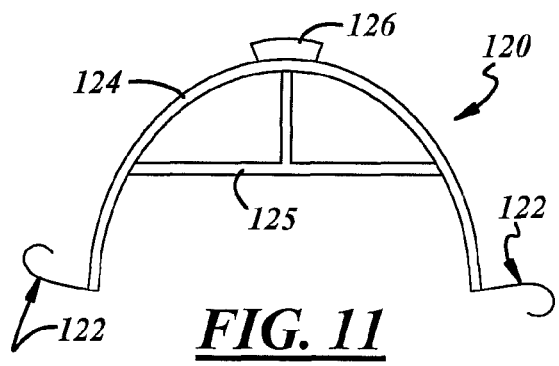
FIG. 11 is an end view of one form of a dampener.

As shown in FIG. 11, in at least one form, a dampener 120 may be substantially rigid and not resilient. To install the dampener 120 on the cable 16, one connection feature 122 is first connected to the cable 16, the cable 16 is bent about a body 124 of the device to dispose part of the cable 16 adjacent to the other connection feature 122, and then the other connection feature 122 is connected to the cable 16. The connection features 122 retain the dampener 120 on the cable 16 and the rigid body 124 of the dampener 120 resists or prevents straightening of the cable 16. The body 124 may include a fixed support flange 125, or a tether or the like to resist straightening or undue bending of the body 124. The dampener 120 may be made of any suitable material such as metal, molded plastic, or the like, and may include a pad 126 as in the other embodiments if desired. The dampener 120 could also comprise a strap or other device connected to the cable 16 when the cable 16 is bent, and inextensible to a desired degree to prevent straightening of the cable 16.

When the cable 16 is bent or otherwise shaped by the dampener, 32, 100, 120 the core 30 may be engaged and held firmly in contact with the inside surface of the conduit 26. The core 30 may engage the conduit 26 in the area of the bend imparted by the dampener 32, 100, 120, such as between the areas of engagement of the connection features 36, 104, 122 with the conduit. Vibrations transmitted by or along the core 30 are then communicated with the conduit 26 and at least partially dissipated or damped by the conduit 26. At least the vibrations in or applied to the conduit 26 may be damped at least in part by the pad 44, 110, 126, connection features 36, 104, 122, or other engagement with the dampener. The dampener 32, 100, 120 may also route the cable 16 in a desired path, such as between or around certain structures in a vehicle. In this regard, the dampener 32, 100, 120 itself may be connectable to or formed as part of another structure to positively locate and retain a desired position of the cable 16, but, as previously noted, this is not necessary.

When applied to the cable 16, the dampener 32, 100, 120 bends the conduit 26 and core 30 into an arc having a radius of between 15 and 200 times the diameter of the core 30. When a dampener 32, 100, 120 is connected to the conduit 26 and the core 30 is engaged with the conduit 26, the force needed to move the core 30 relative to the conduit 26 may be increased by between 10% and 300% as compared to when a dampener 32, 100, 120 is not connected to the conduit 26. Also, the average lash in a given movement of the core 30 relative to the conduit 26 may be decreased by up to about 10% when the dampener 32, 100, 120 is connected to the conduit 26 as compared to when the dampener is not connected to the conduit.

While the forms of the invention herein disclosed constitute presently preferred embodiments, many others are possible. For example, while the specific implementations shown bend the cable 16 in a single curve, more than one bend (for example in the shape of one or more sine waves) may be provided. Such a construction may engage the core to the conduit in more than one place along the core and may include multiple connection features and pads, for example. Further, while termed a "dampener", the device may provide other features and perform other functions, such as controlling the routing of a cable relative to other structures, reducing lash, and/or changing the force needed to move the core relative to the conduit. In the example of a transmission shift lever assembly, changing the force needed to move the core relative to the conduit can alter the shift feel which may be desirable in at least some applications. Still other implementations are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. A shifter assembly for a vehicle transmission, comprising:
    a shifter adapted to move between at least two positions corresponding to different modes of operation of the transmission;
    a cable connection feature associated with the shifter;
    a cable connected to the cable connection feature and adapted to be connected to the transmission such that movement of the shifter is transmitted to the transmission by the cable, the cable including a conduit and a core received within the conduit, and
    a dampener connected to the conduit to bend the conduit and engage the core with the conduit, wherein the dampener is a wire form having spaced apart connection features connectable to the conduit and a body extending between the connection features, the connection features being laterally offset from the body so that the dampener is bent in the shape of the intended bend of the conduit when the dampener is installed on the conduit and the dampener biases the conduit into the bend when connected to the conduit.

2. The shifter assembly of claim 1 wherein the dampener includes a pair of said connection features carried by a body and wherein each connection feature engages the conduit.

3. The shifter assembly of claim 2 wherein the connection features of the dampener are integrally formed in one piece with the body.

4. The shifter assembly of claim 3 wherein the connection features and body of the dampener are of said wire form which is shaped to engage and bend the cable without adjustment of the position of the body relative to the connection features after the dampener is connected to the conduit.

5. The shifter assembly of claim 2 wherein the dampener causes the core to engage the conduit between the areas of engagement of the connection features with the conduit.

6. The shifter assembly of claim 1 which also includes a pad carried by the dampener and adapted to engage the conduit at a location spaced from and not adjoining the connection features when the dampener is connected to and bending the conduit.

7. The shifter assembly of claim 1 wherein the dampener bends the conduit and core into an arc having a radius of between 15 and 200 times the diameter of the core.

8. The shifter assembly of claim 1 wherein the dampener is substantially inflexible such that the conduit and core are bent before the dampener can be connected to the conduit.

9. The shifter assembly of claim 1 wherein the dampener engages the conduit at at least two spaced apart locations.

10. A cable assembly, comprising:
    a conduit including a passage;
    a core received within the passage; and
    a dampener connected to the conduit to bend the conduit so that the conduit is not straight in the area of the bend and engage the core with the conduit, wherein the dampener is a wire form having spaced apart connection features connectable to the conduit and a body extending between the connection features, the connection features being laterally offset from the body so that the dampener is bent into a U-shape and the dampener biases the conduit into a U-shaped bend when the dampener is connected to the conduit.

11. The cable assembly of claim 10 wherein the dampener includes a pair of said connection features interconnected by a body and wherein each connection feature of the dampener is connected to the conduit and the body engages the conduit and bends the conduit and core.

12. The cable assembly of claim 11 wherein the connection features of the dampener are integrally formed as one-piece with the body.

13. The cable assembly of claim 12 wherein the connection features and body of the dampener are defined on said wire form that is bent into its final shape which is adapted to bend the conduit prior to connection of the dampener to the conduit.

14. The cable assembly of claim 11 wherein the dampener causes the core to engage the conduit between the areas of engagement of the connection features with the conduit.

15. The cable assembly of claim 11 wherein the conduit has a circumference, the connection features of the dampener include openings in which the conduit is received and the openings are circumferentially offset relative to the conduit such that the direction of insertion of the conduit into the openings is different at each connection feature of the dampener.

16. The cable assembly of claim 10 which also includes a pad carried by the dampener and adapted to engage the conduit when the dampener is connected to and bending the conduit.

* * * * *